United States Patent [19]

Akiyama

[11] Patent Number: 5,073,881
[45] Date of Patent: Dec. 17, 1991

[54] OPTICAL DISC APPARATUS WITH RAPID AND STABLE ACCESSING CAPABILITY

[75] Inventor: Ryo Akiyama, Hirakata, Japan

[73] Assignee: Matsushita Electric Industrial Co., Ltd., Osaka, Japan

[21] Appl. No.: 209,642

[22] Filed: Jun. 21, 1988

[30] Foreign Application Priority Data

Jun. 24, 1987 [JP] Japan .................. 62-156798
Sep. 2, 1987 [JP] Japan .................. 62-219502

[51] Int. Cl.⁵ .......................................... G11B 7/085
[52] U.S. Cl. .................. 369/32; 369/44.25; 369/44.28; 369/44.32; 369/54
[58] Field of Search .............. 369/32, 43–45, 369/44.25, 44.28, 44.32, 54, 58

[56] References Cited

U.S. PATENT DOCUMENTS

| 4,615,023 | 9/1986 | Inada et al. ............. 369/44.28 X |
| 4,730,298 | 3/1988 | Takahashi .............. 369/44.28 X |
| 4,736,353 | 4/1988 | Kasai et al. ............. 369/32 |
| 4,740,679 | 4/1988 | Doi ..................... 369/45 |
| 4,761,773 | 8/1988 | Okada et al. ............ 369/44 |
| 4,769,803 | 9/1988 | Yamamiya ............... 369/44.28 X |
| 4,773,055 | 9/1988 | Gijzen et al. ........... 369/44.32 X |
| 4,785,439 | 11/1988 | Okada et al. ............ 369/32 |
| 4,837,757 | 6/1989 | Okada et al. ............ 369/44 |
| 4,855,982 | 8/1989 | Orlicki et al. .......... 369/32 X |

FOREIGN PATENT DOCUMENTS

59-38980  3/1984 Japan .
61-214230 9/1986 Japan .

Primary Examiner—Roy N. Envall, Jr.
Assistant Examiner—W. R. Young
Attorney, Agent, or Firm—Wenderoth, Lind & Ponack

[57] ABSTRACT

An optical disc apparatus comprising an optical servo loop and a velocity servo loop to control the velocity of a pickup to zero, wherein the two servo loops are selectively switched in accordance with the set mode of disc playing or the state of such playing. When a fast access is executed, the pickup is controlled by the velocity servo loop to avert undesired vibration in the travel of the pickup and also to protect the optical servo from any shock that may otherwise be caused by the travel and halt of the pickup. And in playing of any disc having a large number of dropouts, the velocity servo loop is closed during the existence of such dropouts to keep the optical servo loop from receiving a disturbance signal generated due to the dropout, thereby ensuring stable reproduction of signals from the disc.

9 Claims, 6 Drawing Sheets

OPTICAL DISC APPARATUS WITH RAPID AND STABLE ACCESSING CAPABILITY

BACKGROUND OF THE INVENTION

1. Field of the Invention

The present invention relates to an optical disc apparatus and, more particularly, to an apparatus for reproducing signals or data recorded on a compact disc, video disc or the like.

2. Description of the Prior Art

In an optical disc player, it is generally customary that a light beam is positioned by cooperation of a rough actuator which comprises a linear motor and so forth for driving a pickup-base, and a fine actuator for driving a focus lens mounted on the pickupbase.

For example, when an access is executed in the ordinary optical disc player, first the pickup-base is positioned approximately at a desired target point by the rough actuator, and then the fine actuator mounted on the pickup-base is driven under fine control to position the focus lens exactly on the target track.

However, in case the rough actuator is driven at a high speed for a fast access, the focus lens held by the fine actuator is deflected due to the acceleration caused at the start or halt of the rough actuator or by the vibration induced during the travel thereof, so that the fine actuator is kept in vibration for a while even after the halt of the pickup-base in the vicinity of the target, thereby raising a problem that the fine actuator cannot be brought into servo control with stability and rapidity.

In an attempt to solve the above problem, there is proposed an improved system wherein a position detector is disposed in the vicinity of the fine actuator, and a position servo loop applying the output signal of the position detector as an error signal is formed during the travel of the pickup-base to lock the fine actuator at its mechanically neutral point, thereby preventing vibration of the fine actuator.

However, there still remain some problems unsolved with regard to complication in the structure of the position detector and difficulties in constituting a stable position servo circuit due to the d-c drift in the component elements of the position servo circuit, and also the secular change caused therein such as temperature fluctuation in particular.

For the purpose of eliminating the above-described drawbacks existing in forming a stable position servo circuit, an improvement has been accomplished as disclosed in Japanese Patent Laid-open No. 61 (1986)-214230, wherein a position servo loop is so formed that the position of the fine actuator immediately before a fast displacement of the pickup-base is stored in a hold circuit and the fine actuator is retained at such position during the travel of the pickup-base.

According to the above system, a position detector is disposed in the vicinity of the fine actuator to produce an output serving as a position error signal, and a position servo loop is formed in such a manner as to use, as a reference servo signal, the position error signal obtained from the position detector and stored in the hold circuit immediately before the fast displacement of the pickup-base, so that despite any variation in the characteristic of the position detector, the servo control is effected while such variation is absorbed to consequently settle the problems including the aforementioned d-c drift, secular change and temperature fluctuation.

In the above system, however, it becomes necessary to employ a hold circuit for storing the position data therein, hence failing in solution of the problem with regard to the complicated structure of the apparatus.

Furthermore, according to the above system, a reference position signal of the position servo loop is derived from the position error signal obtained by holding the position error output, which is produced from the position detector disposed in the vicinity of the fine actuator, at the value immediately before start of the travel of the pickup-base. Therefore, although it may be possible to solve the problem of vibration of the pickup-base during its travel, another disadvantage is still existent that, if the pickup-base begins its travel with the fine actuator inclined due to some eccentricity of the disc or the like, the fine actuator is driven continuously while being retained in such inclined posture. And when the travel of the pickup-base is brought to a halt, the fine actuator is still kept in the inclined posture and the tracking servo mode is selected in such state, so that the operation is limited by the dynamic range of the servo circuit and the mechanical dynamic range of the fine actuator to eventually bring about instability with respect to the tracking servo pull-in action.

Moreover, upon occurrence of any dropout during reproduction of signals from a disc (or playing of a disc) in the conventional optical disc player, a great disturbance signal is generated in each of the error signals in the focus servo loop and the tracking servo loop formed to control the fine actuator which supports the focus lens therein, hence causing a trouble that the focus lens is positionally deviated.

In an attempt to solve this problem, an improved invention has been contrived as described in Japanese Patent Laid-open No. 59 (1984)-38980. According to the technique disclosed, in reproduction of signals from any disc having many dropouts, the gain of each servo loop is lowered by means of a manual switch to relatively reduce the amplitude of the disturbance signal generated during the occurrence of such dropouts, thereby minimizing the deviation of the focus lens.

But an important problem is still left unsolved in the system mentioned above that, when setting a stable servo gain for each loop, it becomes necessary to previously find a disc having many dropouts (as the amount of dropouts is unknown until signals recorded on the disc is actually reproduced in the player) and, even with prior setting of an optimal gain by reduction of its value, there occurs an adverse side effect that the operation is influenced readily by external mechanical vibration.

There is further known another system with regard to a countermeasure for such dropout, wherein, during generation of the dropout detected by some other means, the servo loop is opened so that the disturbance signal is not transmitted to the fine actuator, thereby preventing a positional deviation of the focus lens.

The system mentioned above is capable of relatively diminishing the adverse side effect that the operation is influenced by the external vibration, since the servo loop is opened merely for the moment of the dropout.

However, because of the structure where the focus lens is supported by a mechanical damper, the restoring force derived from the elasticity of the damper itself is exerted to move the focus lens which is placed in a noncontrolled state during generation of the dropout. Consequently, at the termination of the dropout, the focus lens thus moved is on another track spaced apart from the desired former track prior to the dropout.

Furthermore, in some of the laser disc players manufactured in a relatively early stage of the technical development, the focus lens is not furnished with a mechanical damper in regard to the focus controlling direction and is supported merely by electromagnetic means (focus servo) alone, so that the position of the focus lens is varied due to the gravity during the dropout period and a great servo error signal corresponding to such positional deviation is generated at the termination of the dropout to eventually bring about instability of the operation.

SUMMARY OF THE INVENTION

In the optical disc apparatus of the present invention, an optical servo loop is formed for positioning a light spot on a disc with a fine actuator which holds a focus lens therein and is mounted on a rough actuator. Furthermore, means for detecting the motion of the fine actuator is provided and, in addition to the optical servo loop, a velocity servo loop is formed for extracting a velocity signal from the output of such detecting means and feeding the velocity signal back to the fine actuator, wherein the two servo loops are selectively switched in accordance with the set mode of disc reproduction or the state of such reproduction.

It is a first object of the present invention to suppress vibration of the fine actuator, where the focus lens is held, during the travel of a pickup-base driven by the rough actuator, so as to execute an access with rapidity and stability.

A second object of the invention resides in achieving a stable servo pull-in action within a short time when leading the operation into the optical servo loop again after the fast travel of the pickup-base.

A third object of the invention is to perform stable reproduction of signals or data from any disc having an extremely great amount of dropouts.

For the purpose of attaining the first object, the optical servo loop (tracking servo loop and/or focus servo loop) is opened during the fast travel of the pickup-base driven by the rough actuator, and simultaneously the velocity servo loop is closed with a reference velocity set to zero, thereby suppressing the vibration of the focus lens held in the fine actuator.

In order to attain the second object, the fine actuator is placed in a noncontrolled state for a predetermined time after completion of the fast travel of the pickup-base driven by the rough actuator, and then the optical servo loop is closed again; or the velocity servo loop is closed for a fixed time after the fine actuator is placed in a noncontrolled state for a predetermined time, and subsequently the former optical servo loop is closed again.

To attain the third object, detection means is provided for detecting any dropout on the disc, and the optical servo loop is opened during the existence of such dropout while the velocity servo loop is closed with the reference velocity set to zero, thereby locking the motion of the fine actuator to prevent the focus lens from being driven by any servo-disturbing error signal generated during the dropout.

BRIEF DESCRIPTION OF THE DRAWINGS

FIG. 7 (A), FIG. 7(B) and FIG. 7(C), consisting of $(a)-(f)$, illustrate the operations performed upon occurrence of a dropout in the third embodiment of the invention, in which (A) represents an example without any countermeasure for the dropout, (B) represents an example with a conventional countermeasure, and (C) represents another example with the countermeasure according to the invention.

DESCRIPTION OF THE PREFERRED EMBODIMENTS

Figure 1:
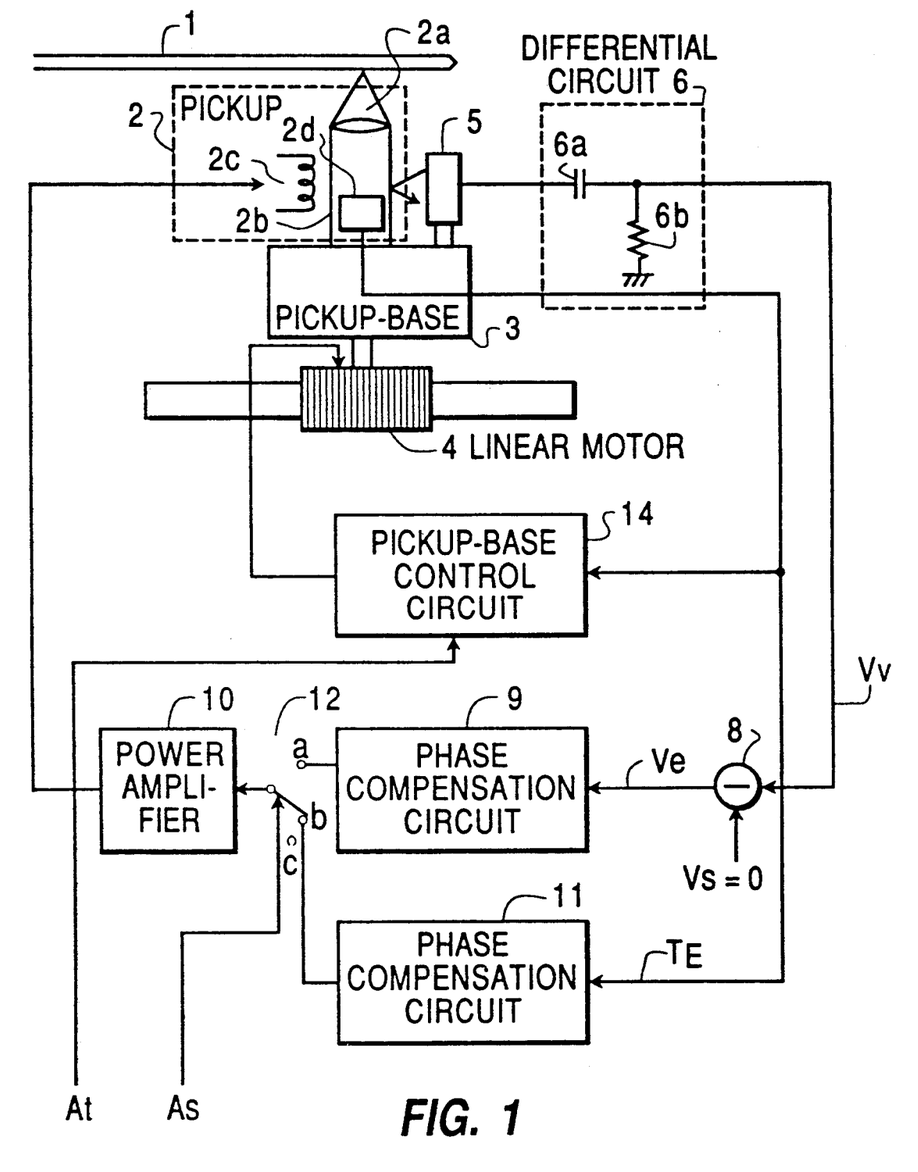
FIG. 1 is a block diagram of a first embodiment of the present invention.

FIG. 1 is a block diagram showing the basic constitution of an optical disc apparatus embodying the present invention. In this diagram are included a disc 1, and a pickup 2 which comprises a focus lens 2a, a 2c for driving the force line 2a in a tracking direction, damper 2b for supporting the focus lens 2a, a drive coil and a tracking error detector 2d for detecting a tracking error. The damper 2b and the drive coil 2c constitute a fine actuator. Actually the fine actuator includes another set of a damper and a drive coil for driving the focus lens in a focusing direction, which are not shown in the figure to avoid complexity.

There are also shown a pickup-base 3 for mounting the pickup 2 thereon, a linear motor 4 for driving the pickup-base 3, and a position detector 5 fixedly by mounted on the pickup base 3 for detecting, in the tracking direction, the position of the focus lens 2a. The position output signal obtained from the position detector 5 is converted to a velocity signal Vv by a differential circuit 6 consisting of a capacitor 6a and a resistor 6b.

The velocity signal Vv is fed to a subtractor 8, which compares the input signal $V_v$ with a reference velocity signal $V_s$ thereby to generate a velocity error signal Ve. The velocity error signal Ve thus obtained is fed to a power amplifier 10 via a phase compensation circuit 9 for advancing the phase in a higher frequency range and a selector switch 12 controlled by an access order signal As, and the output of the amplifier 10 is then fed to the drive coil 2c.

A velocity servo loop is constituted by the above-described position detector 5, differential circuit 6, subtractor 8, phase compensation circuit 9, selector switch 12, power amplifier 10 and drive coil 2c.

In such velocity servo loop, the velocity of the focus lens 2a can be controlled to be zero, or locked, by setting the reference velocity signal Vs to zero.

Reference numeral 11 denotes a phase compensation circuit for stabilizing the servo control by advancing the phase in a higher frequency range of the output signal of the tracking error detector 2d. A tracking servo loop is constituted by the above-described tracking error detector 2d, phase compensation circuit 11, selector switch 12, power amplifier 10 and drive coil 2c.

Such tracking servo loop enables a light beam, which is outputted from the pickup 2, to exactly follow a desired track on the disc 1.

Denoted by reference numeral 14 is a pickup-base control circuit which, in a normal reproduction mode, amplifies the output signal TE of the tracking error detector 2d and feeds the amplified signal to the linear motor 4 or, when moving the pickup-base 3 fast, feeds a full acceleration signal to the linear motor 4. The operation of the control circuit 14 is selectively switched by the access order signal At.

A traverse control circuit is constituted by the above-described tracking error detector 2d, pickup-base control circuit 14 and linear motor 4 for controlling, in the normal reproduction mode, the motion of the pickup-base 3 in its radial direction.

Although there is not shown in FIG. 1 a block of a focus servo to perform focus control between the disc 1 and the focus lens 2a, it is assumed here that the focus servo control is continuously effected with stability.

Figure 2:
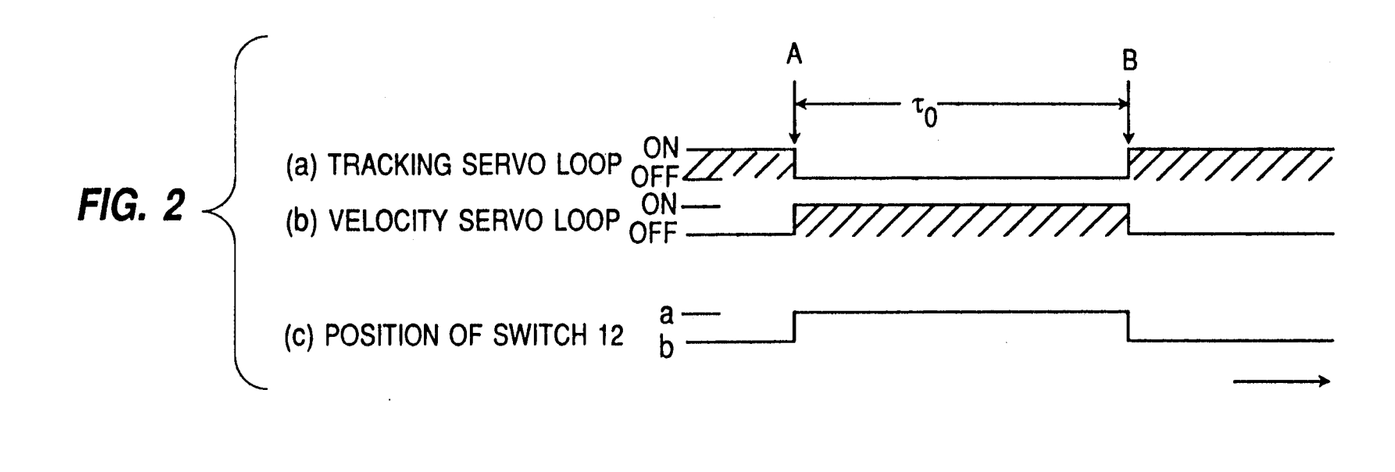
FIG. 2, consisting of $(a)-(c)$, is a timing chart showing the states of individual servo loops in the first embodiment of the invention.

FIG. 2 is a timing chart showing the states of the individual servo loops and the relationship therebetween when an access is executed during reproduction of signals or data from a disc in the present invention.

In FIG. 2, (a) and (b) represent the state of the tracking servo loop and that of the velocity servo loop, respectively; and (c) represents the position of connection of the selector switch 12. Furthermore, A and B indicate an access start point and an access end point, respectively.

In the timing chart of FIG. 2, the tracking servo loop is switched off or opened during the access time (τ0) between the points A and B corresponding to the fast travel of the pickup-base 3, and the velocity servo loop is switched on or closed with the reference velocity signal Vs set to zero. Accordingly the focus lens 2a is locked to the pickup-base 3 until the point B where the fast travel of the pickup-base 3 is terminated, and the velocity servo loop is switched over to the tracking servo loop in a state where the focus lens 2a is kept relatively still, so that proper servo pull-in can be executed with stability in a short period of time.

Since the focus lens 2a is locked to the pickup-base 3 during a rough access, if any vibration of the focus lens 2a is caused by a great acceleration derived from start or halt of the rough access or by the vibration generated during the travel of the pickup-base 3, the velocity is controlled to zero by the velocity servo loop to consequently suppress such vibration of the focus lens 2a, whereby the tracking servo control can be effected with stability immediately after completion of the rough access.

Figure 3:
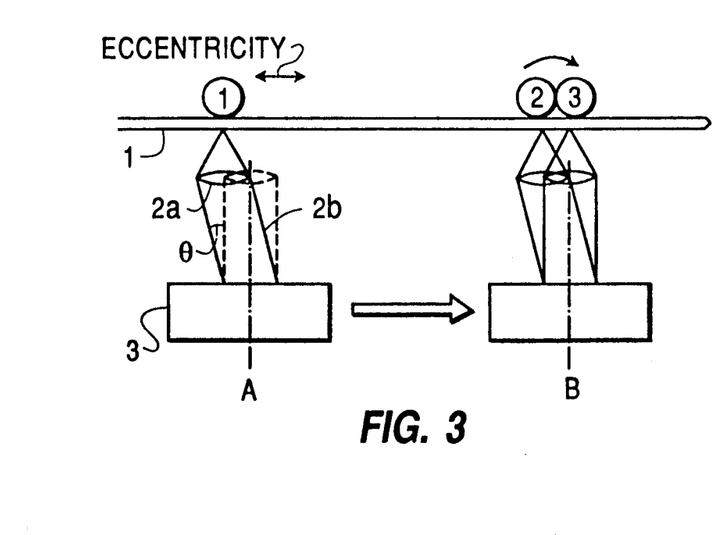
FIGS. 3A and 3B illustrate the behavior of focus lenses in a second embodiment of the invention.
Figure 4:
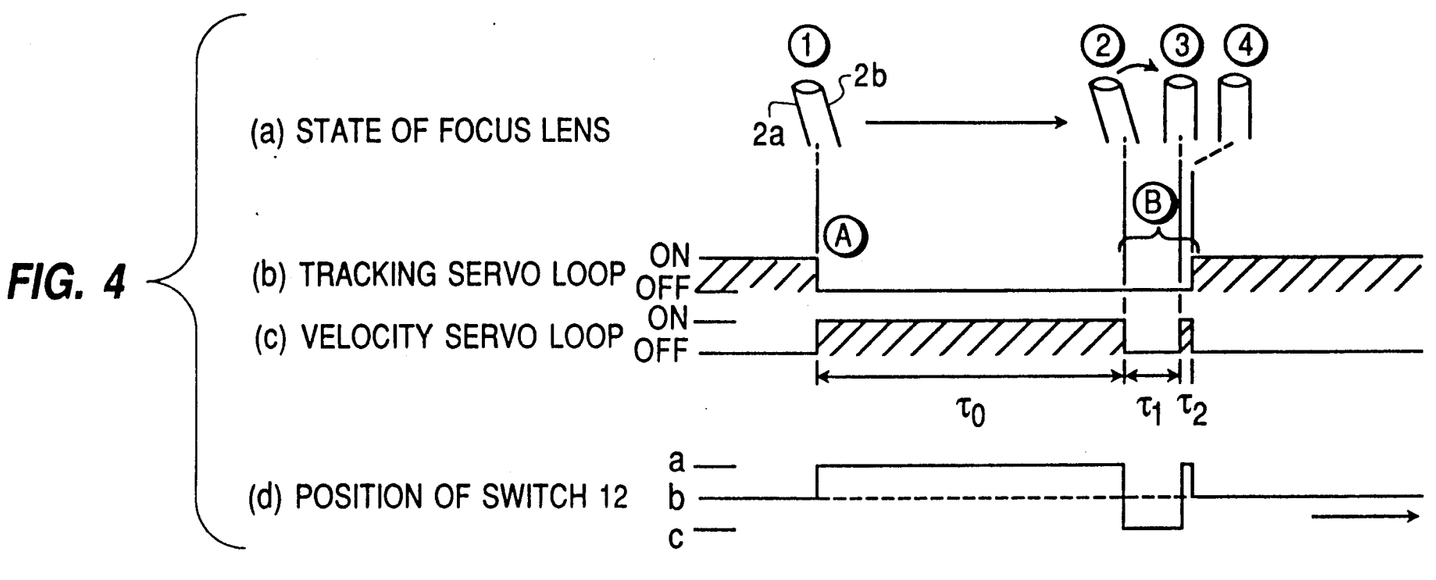
FIG. 4, consisting of $(a)-(d)$, is a timing chart showing the states of individual servo loops in the second embodiment of the invention.
Figure 5:
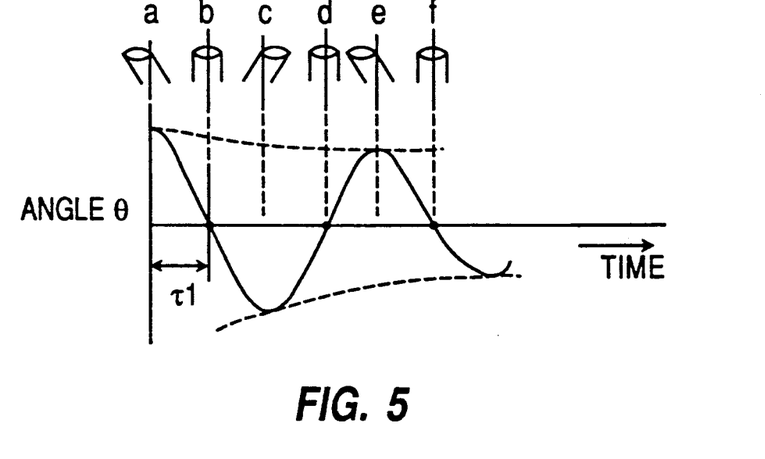
FIG. 5, consisting of $(a)-(f)$, graphically shows the operation of the focus lens in the second embodiment of the invention.

FIGS. 3, 4 and 5 relates to a second embodiment of the optical disc apparatus according to the present invention, explaining the operation to control the position of the focus lens 2a to its optimal state for resuming the tracking servo control with rapidity and stability immediately after the fast travel of the pickup-base 3.

The basic block constitution of the second embodiment is the same as that of the first embodiment shown in FIG. 1.

FIG. 3 illustrates the states of the focus lens 2a immediately before and after a fast access. FIG. 4 (a), (b), (c) and (d) are timing charts respectively showing the motion of the focus lens 2a, the state of the tracking servo loop, the state of the velocity servo loop, and the state of connection of the selector switch 12. FIG. 5 graphically shows the behavior of the focus lens 2a when it is suddenly shifted from an inclined state to a free state.

Hereinafter the operation of the second embodiment will be described in detail with reference to FIGS. 3 through 5.

In FIG. 3, A denotes an access start point. Suppose now that the focus lens 2a starts its travel from the point A together with the pickup-base 3 while being locked in an inclined posture at an angle $\theta$ due to the eccentricity of the disc.

Upon arrival of the pickup-base 3 at a point B after its fast travel, the servo loop is opened for a predetermined time, and then the focus lens 2a is urged to automatically return to its mechanically neutral point by the elasticity of the damper 2b, so that proper tracking can be achieved by closing the tracking servo loop in accordance with a shift of the focus lens 2a to the point of its upright posture, i.e., from a position ② to another position ③.

In the timing chart of FIG. 4, the selector switch 12 is connected to the side a during the travel of the pickup-base 3 (corresponding to time τ0) to form the velocity servo loop with the reference velocity Vs set to zero, so that the inclination of the focus lens 2a is as represented by ① and ② in the chart.

During the next time τ1, the switch 12 is connected to the side c to open the entire servo loops, whereby the focus lens 2a is rendered free and then is returned automatically to its mechanically neutral point (③ in FIG. 4) by the elasticity of the damper 2b.

Subsequently the switch 12 is connected to the side a again during the next time τ2, so that the velocity of the focus lens 2a caused by the motion of the damper 2b is controlled to zero at the position ③ of the upright posture, and therefore the focus lens 2a is brought to a halt to be ready for re-pulling in the tracking servo.

Due to the series of operations mentioned above, the focus lens 2a is retained in its upright posture and the velocity thereof can be controlled to zero even immediately after the fast drive of the pickup-base 3, whereby the tracking servo control can be resumed with rapidity and stability.

FIG. 5 is a graphic representation for explaining the length of the time 1 during which the entire servo loops are opened (with the selector switch 12 connected to the side c) in the operation described above.

FIG. 5 indicates that when the focus lens 2a is suddenly rendered free from the inclined state a, its inclination becomes zero at each of points b, d, f and so forth.

Although the focus lens 2a is thus retained upright at any of the points b, d, f and so forth, it is desired that normally the focus lens 2a be set at the first upright point b since the earlier the timing to pull in the tracking servo, the better the result attained.

Relative to the resonance frequency f0 (Hz) of the damper 2b for holding the focus lens 2a therein, the time of its one period is approximately 1/f0 (which is slightly varied by the damping factor of the resonance system of the damper 2b including the focus lens 2a). Therefore, in this example, the time τ1 for opening the entire servo loops comes to be about ½·f0 (sec).

It follows that, after the travel of the pickupbase 3, the focus lens 2a is rendered free for the time τ1 which is substantially equal to ¼ of the resonancefrequency period of the pickup 2 including the focus lens 2a, so that it becomes possible to attain high stability when pulling in the tracking servo.

The length of the time τ2 is determined by the gain of the velocity servo loop, and it can be reduced to a sufficiently small value which is normally less than several milliseconds.

In the second embodiment mentioned, after the focus lens 2a is placed in its noncontrolled free state for the time τ1, the velocity servo loop is closed merely during the time τ2 for reducing the velocity of the focus lens 2a to zero, and then the tracking servo loop is closed. However, in case the gain of the tracking servo loop is sufficiently high, a stable pull-in action is possible even when the focus lens 2a has a velocity, so that the time τ2 for closing the velocity servo loop may be omitted to execute direct pull-in of the tracking servo.

Figure 6:
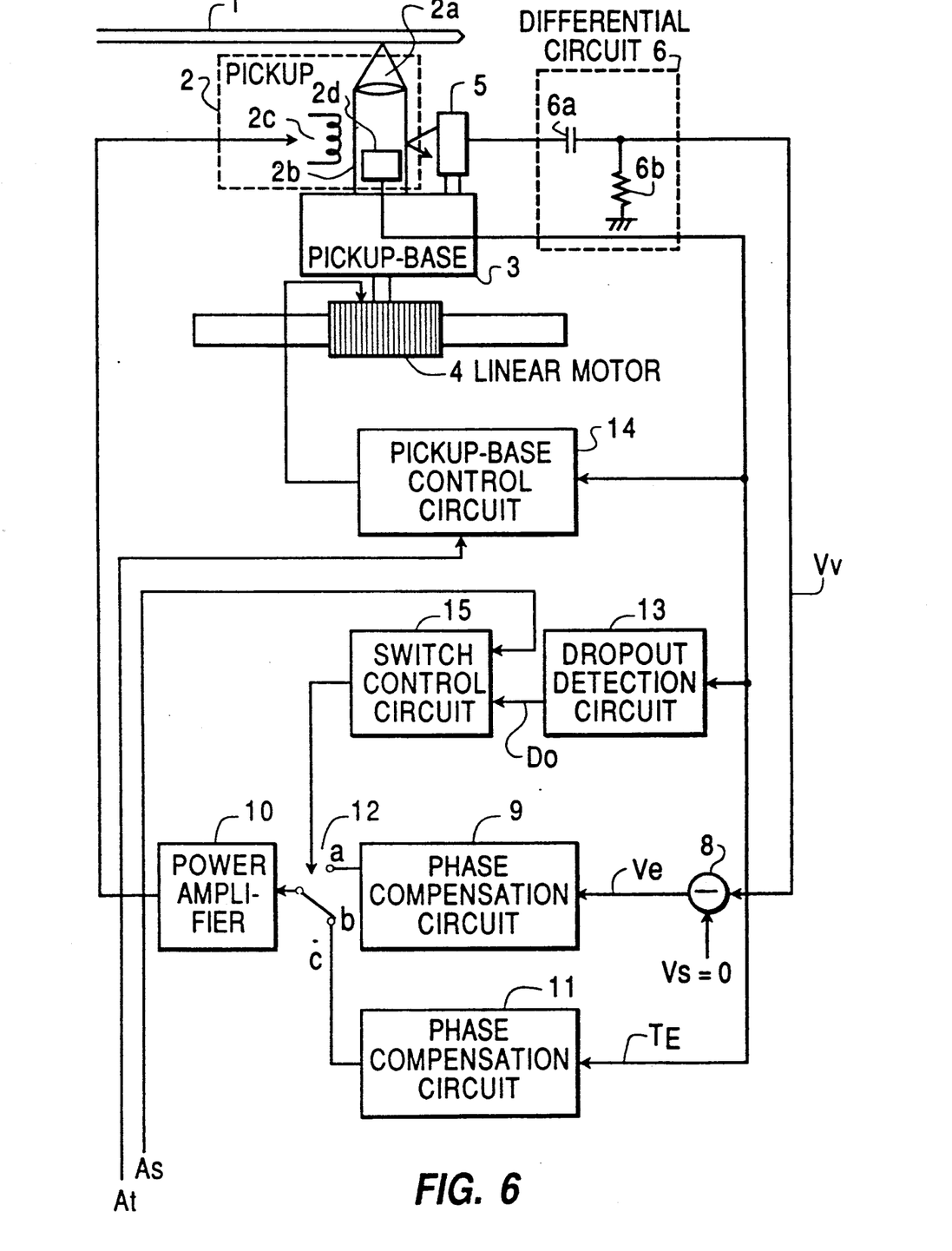
FIG. 6 is a block diagram of a third embodiment of the invention.

FIG. 6 is a block diagram of a third embodiment of the optical disc apparatus according to the present invention, and it is so constituted as to solve the known problem that, upon occurrence of any dropout during reproduction mode, the focus lens is deviated by a great disturbance signal generated in the servo loop (in the focusing or tracking direction).

The constitution of FIG. 6 is accomplished by providing, in addition to the aforementioned first embodiment of FIG. 1, a dropout detection circuit 13 for detecting dropout data from the tracking error signal TE, and a switch control circuit 15 for combining the access order signal As with the output of the dropout detection circuit 13 and controlling the selector switch 12 by such combined signal.

In the third embodiment, the access order signal serves to directly control the switch 12 via the switch control circuit 15, so that the operation performed in this case is exactly the same as that in the foregoing second embodiment.

Figure 7A:
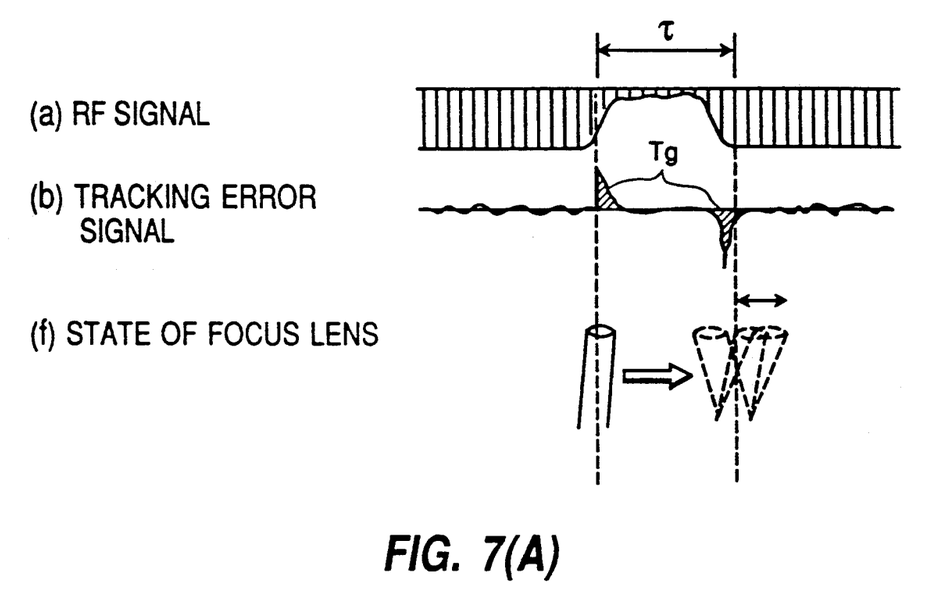
Figure 7B:
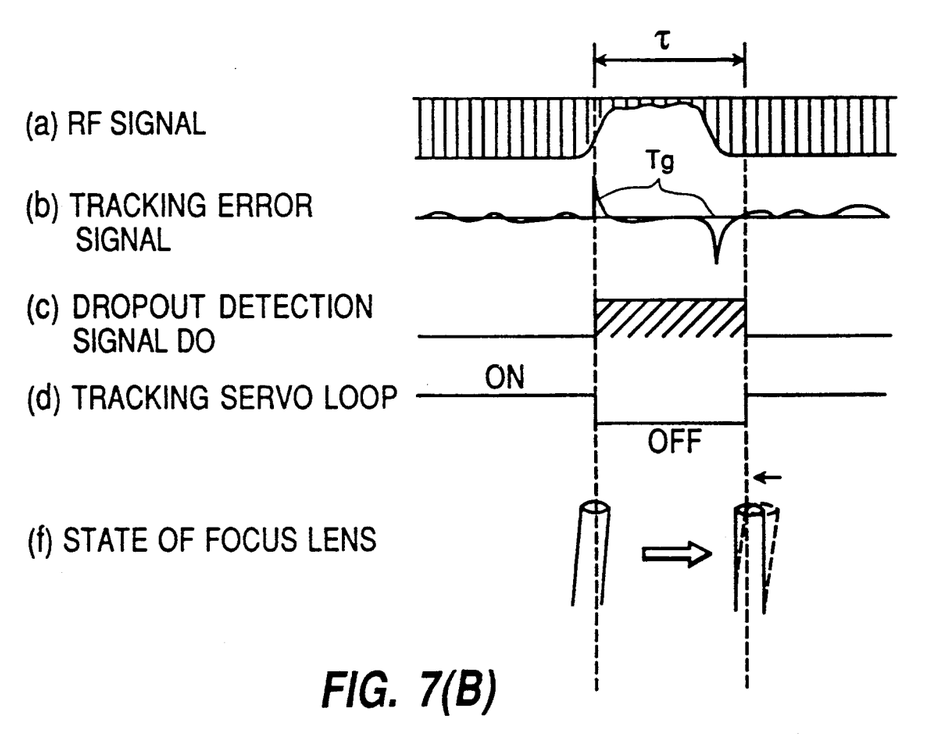
Figure 7C:
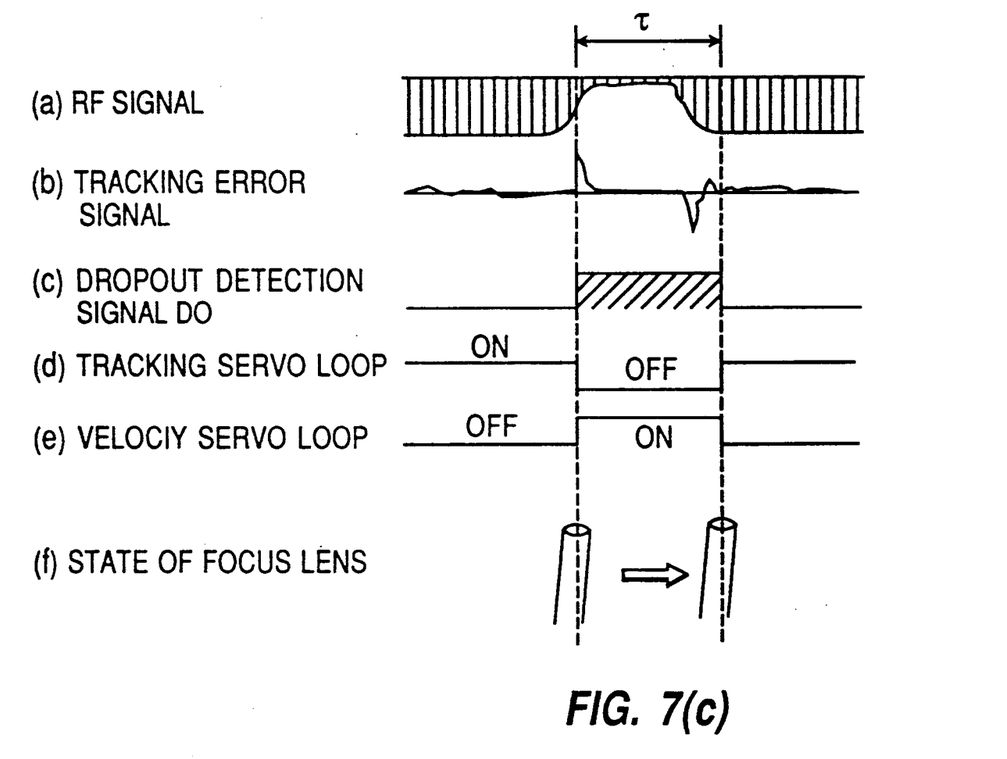

FIG. 7 illustrates the behavior of the focus lens 2a upon occurrence of any dropout in the reproduction mode, so as to explain the effect of the third embodiment of the present invention.

FIG. 7 (A) represents an exemplary case where no particular countermeasure is taken, i.e. none of dropouts is detected and the servo loops are not switched either.

FIG. 7 (B) represents another case where a signal is generated by detecting the occurrence of a dropout, and the tracking servo loop is opened during the time τ of such dropout in response to the detection signal, thereby placing the focus lens 2a in a noncontrolled free state to minimize the harmful influence derived from disorder of the tracking error signal. This operation is based on one of the conventional techniques known heretofore.

And FIG. 7 (C), which corresponds to the third embodiment of the present invention, represents a further case where the tracking servo loop is opened during the dropout time τ and simultaneously the velocity servo loop is closed with the reference velocity Vs set to zero.

In FIG. 7 (A), (B) and (C): (a) shows the waveform of an RF signal detected from the disc by an RF signal detector omitted in the block diagram of FIG. 6 ; (b) shows the waveform of a tracking error signal TE; (c) shows the waveform of a dropout detection signal D0 outputted from the dropout detection circuit 13; (d) shows the state of the tracking servo loop; (e) shows the state of the velocity servo loop; and (f) shows the behavior of the focus lens 2a.

In the first case of FIG. 7 (A) where no countermeasure is taken, a component Tg different from the original tracking signal is generated in the tracking error signal TE during the dropout time (signifying in this embodiment the time period in which the tracking error signal TE is disordered to a great extent). Consequently, there arises a trouble that the focus lens 2a is deflected widely by such disturbance component Tg and, at the instant of termination of the dropout, the focus lens 2a is deviated far from the original track and is not returnable to the former state.

In the conventional system of FIG. 7 (B) where the tracking servo loop is opened during the dropout time, if any disturbance component Tg not included in the original tracking signal is generated, the selector switch 12 is controlled by the dropout detection signal D0 of the dropout detection circuit 13 via the switch control circuit 15, so that the switch 12 is connected to the side c to open the entire servo loops, whereby the disturbance component Tg is not transmitted to the coil 2c for driving the focus lens 2a, which is consequently not deviated far as in the foregoing example of FIG. 7 (A).

However, the damper 2b holding the focus lens 2a therein has a specific elasticity and therefore exerts a mechanical restoring force on the focus lens 2a, which is thereby urged to automatically return to its mechanical neutral point. In most cases, accordingly, there arises a problem that a positional discrepancy is induced between the position of the focus lens 2a at the dropout start instant and that at the dropout end instant.

That is, at the instant of termination of the dropout, tracking servo is effected on another track spaced apart slightly from the desired track, and consequently there also occurs a deviation of the light beam.

According to the present invention of FIG. 7 (C), the selector switch 12 is controlled by the dropout detection signal D0 during the dropout time τ in such a manner as to be connected to the side a to form the velocity servo loop with the reference velocity Vs set to zero, so that the velocity of the focus lens 2a in the tracking direction is maintained at zero. In other words, the focus lens 2a is positionally locked and retained in this case, and therefore its position at the termination of the dropout remains unchanged in comparison with that at the beginning of the dropout. As a result, despite sudden switchover to the tracking servo loop, the tracking servo control can be resumed on the same track with stability.

In any of the exemplary embodiments of the present invention explained hereinabove, the description has been given with respect to the operation performed in the tracking direction. It is to be understood, however, that the present invention is not limited to the above examples alone, and similar effects are also achievable with regard to the control action in the focusing direction as well. Since the operation in the focusing direction is fundamentally the same as that in the tracking direction, a repeated explanation is omitted here.

What is claimed is:

1. An optical disc apparatus comprising:
   pickup means for forming a light spot on an optical disc and detecting a light from said optical disc, said pickup means including (a) a focus lens, and (b) a fine actuator for movably supporting thereon said focus lens and moving said focus lens;
   light spot positioning means for positioning said light spot on said optical disc, said light spot positioning means constituting an optical servo loop including (a) position error detection means for detecting a position error of said light spot and producing a position error signal indicative of the detected position error of said light spot, (b) first phase compensation means for compensating a phase of said position error signal to obtain a phase-compensated position error signal, and (c) means for feeding said phase-compensated position error signal to said fine actuator;

traversing means for moving said pickup means in a radial direction of said optical disc, said traversing means being responsive to an externally given access order signal applied thereto in an access operation mode for moving said pickup means at a high speed to a desired position;

velocity control means for controlling a velocity of said focus lens, said velocity control means constituting a velocity servo loop including (a) velocity detection means for detecting a velocity of said focus lens and producing a velocity signal indicative of the velocity of said focus lens, (b) velocity error signal producing means for velocity signal indicative of the velocity of said focus lens, (b) velocity error signal producing means for comparing the velocity signal with a predetermined reference velocity to produce an error therebetween as a velocity error signal, (c) second phase compensation means for compensating a phase of the velocity error signal to obtain a phase-compensated velocity error signal, and (d) means for feeding said phase-compensated velocity error signal to said fine actuator; and switching means selectively operable in one of a first mode for closing said optical servo loop and opening said velocity servo loop, a second mode for closing said velocity servo loop and opening said optical servo loop, and a third mode for opening both said optical and velocity servo loops, wherein said switching means operates in said third mode for a first predetermined period of time immediately after said traversing means has stopped moving at the high speed, thereafter operates in said second mode for a second predetermined period of time, and thereafter operates in said first mode.

2. An optical disc apparatus according to claim 1, wherein said reference velocity is set to zero in said velocity servo loop.

3. An optical disc apparatus according to claim 1, wherein said velocity servo loop includes at least one of a focusing-direction velocity servo loop and a tracking-direction velocity servo loop.

4. An optical disc apparatus according to claim 1, wherein said velocity detection means comprises a position detector for detecting a position of said focus lens, and a differentiation circuit for blocking through a compactor one of the direct-current component and ultra-low-frequency component in an output of said position detector.

5. An optical disc apparatus according to claim 1, wherein said first predetermined time is substantially equivalent to n/4, where n is an odd integer, of a period of a resonance-frequency of said fine actuator.

6. An optical disc apparatus comprising:

pickup means for forming a light spot on an optical disc and detecting a light from said optical disc, said pickup means including (a) a focus lens, and (b) a fine actuator for movably supporting thereon said focus lens and moving said focus lens;

light spot positioning means for positioning said light spot on said optical disc, said light spot positioning means constituting an optical servo loop including (a) position error detection means for detecting a position error of said light spot and producing a position error signal indicative of the detected position error of said light spot (b) first phase compensation means for compensating a phase of said position error signal to obtain a phase-compensated position error signal, and (c) means for feeding said phase-compensated position error signal to said fine actuator;

traversing means for moving said pickup means in a radial direction of said optical disc;

velocity control means for controlling a velocity of said focus lens, said velocity control means constituting a velocity servo loop including (a) velocity detection means for detecting a velocity of said focus lens and producing a velocity signal indicative of the velocity of said focus lens, (b) velocity error signal producing means for comparing the velocity signal with a predetermined reference velocity to produce an error therebetween as a velocity error signal, (c) second phase compensation means for compensating a phase of the velocity error signal to obtain a phase-compensated velocity error signal, and (d) means for feeding said phase-compensated velocity error signal to said fine actuator;

dropout detection means for detecting an occurrence of a dropout of data recorded on said optical disc and producing a dropout detection signal indicative of the occurrence of the dropout;

switching means for selectively closing one of said optical servo loop and said velocity servo loop; and control means responsive to said dropout detection signal for controlling said switching means so as to open said optical servo loop and close said velocity servo loop.

7. An optical disc apparatus according to claim 6, wherein said reference velocity is set to zero in said velocity servo loop.

8. An optical disc apparatus according to claim 6, wherein said velocity servo loop includes at least one of a focusing-direction velocity servo loop and a tracking-direction velocity servo loop.

9. An optical disc apparatus according to claim 6, wherein said velocity detection means comprises a position detector for detecting a position of said focus lens, and a differentiation circuit for blocking through a capacitor one of the direct-current component and ultra-low-frequency component in an output of said position detector.

* * * * *